(12) United States Patent
Nilsson et al.

(10) Patent No.: US 10,733,413 B2
(45) Date of Patent: Aug. 4, 2020

(54) OPTICAL IN-DISPLAY FINGERPRINT SENSOR AND METHOD FOR MANUFACTURING SUCH A SENSOR

(71) Applicant: Fingerprint Cards AB, Göteborg (SE)

(72) Inventors: René Nilsson, Eslöv (SE); Hans Martinsson, Göteborg (SE)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 16/365,804

(22) Filed: Mar. 27, 2019

(65) Prior Publication Data

US 2020/0074137 A1 Mar. 5, 2020

(30) Foreign Application Priority Data

Aug. 29, 2018 (SE) ...................................... 1851024

(51) Int. Cl.
*G06K 9/00* (2006.01)
*G06F 3/042* (2006.01)
*G06F 3/0488* (2013.01)

(52) U.S. Cl.
CPC .......... *G06K 9/0004* (2013.01); *G06F 3/042* (2013.01); *G06K 9/00087* (2013.01); *G06F 3/0488* (2013.01)

(58) Field of Classification Search
None
See application file for complete search history.

(56) References Cited

U.S. PATENT DOCUMENTS

| 2007/0109438 | A1 | 5/2007 | Duparre et al. |
| 2012/0086794 | A1 | 4/2012 | Burcham et al. |
| 2016/0224816 | A1 | 8/2016 | Smith et al. |
| 2016/0286199 | A1 | 9/2016 | Wajs et al. |
| 2017/0126982 | A1 | 5/2017 | Suh et al. |
| 2017/0220838 | A1 | 8/2017 | He et al. |
| 2017/0220844 | A1 | 8/2017 | Jones et al. |
| 2018/0203247 | A1 | 7/2018 | Chen et al. |
| 2019/0102595 | A1* | 4/2019 | Lee ...................... G06F 3/0412 |

FOREIGN PATENT DOCUMENTS

| CN | 109215604 A | 1/2019 |
| WO | 2017062506 A1 | 4/2017 |
| WO | 2018064563 A1 | 4/2018 |
| WO | 2018113126 A1 | 6/2018 |

OTHER PUBLICATIONS

Swedish Search Report dated Feb. 22, 2019 for Swedish Application No. 1851024-8, 3 pages.

* cited by examiner

*Primary Examiner* — Atiba O Fitzpatrick
(74) *Attorney, Agent, or Firm* — RMCK Law Group, PLC (57) ABSTRACT

The invention relates to an optical biometric imaging device configured to capture an image of an object in contact with an outer surface of the biometric imaging device, the biometric imaging device comprising: an image sensor comprising a photodetector pixel array; a transparent substrate arranged to cover the image sensor; a transmission mask arranged to cover the transparent substrate, wherein the transmission mask comprises a plurality of openings, the openings forming a coded aperture configured to project a coded image of an object in contact with the outer surface of the imaging device onto the image sensor; and image sensor circuitry configured to capture an image corresponding to the coded image projected onto the image sensor.

8 Claims, 6 Drawing Sheets

OPTICAL IN-DISPLAY FINGERPRINT SENSOR AND METHOD FOR MANUFACTURING SUCH A SENSOR

CROSS REFERENCE TO RELATED APPLICATIONS

This application claims priority to Swedish Application No. 1851024-8 filed on Aug. 29, 2018, the disclosure of which is incorporated herein by reference in its entirety.

FIELD OF THE INVENTION

The present invention relates to an optical fingerprint sensing device integrated in a display panel and to a method for manufacturing such a sensor. In particular, the invention relates to an optical fingerprint sensor comprising a coded aperture.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

US 2007/0109438 describe an optical imaging system which may be used as a fingerprint sensor where microlenses are arranged to redirect light onto a detector. In the described imaging system, each microlens constitutes a sampling point and the microlenses are arranged close to each other to increase the image resolution. To avoid mixing of light received from adjacent microlenses, micro-channels or apertures are arranged between the microlenses and the detector.

However, to achieve a high-resolution sensor, the microlenses will have to be made small and be manufactured with high precision, making the manufacturing process complex and sensitive to variations, and a sensor of the described type comprising small microlenses will also be sensitive to spatial differences in transmissivity in any layer covering the sensor.

Accordingly, it is desirable to provide an improved optical fingerprint sensing device.

SUMMARY

In view of above-mentioned and other drawbacks of the prior art, it is an object of the present invention to provide an improved optical biometric imaging device utilizing a coded aperture. The biometric imaging device will be discussed with reference to a fingerprint sensing device. However, the described technology may equally well be used for other types of biometric imaging, such a palmprint imaging.

According to a first aspect of the invention, there is provided a biometric imaging device configured to capture an image of an object in contact with an outer surface of the biometric imaging device, the biometric imaging device comprising: an image sensor comprising a photodetector pixel array; a transparent substrate arranged to cover the image sensor; a transmission mask arranged to cover the transparent substrate, wherein the transmission mask comprises a plurality of openings forming a coded aperture configured to project a coded image of an object in contact with the outer surface of the imaging device onto the image sensor; and image sensor circuitry configured to capture an image corresponding to the coded image projected onto the image sensor.

Coded aperture imaging is based on the principle of blocking the incoming light in a known pattern so that a coded shadow is cast upon the image sensor. The properties of the originally emitted light, i.e. the light reaching the coded aperture, can then be mathematically reconstructed from this shadow image.

The present invention is based on the realization that the concept of coded aperture imaging can be implemented in an optical fingerprint sensor. In particularly, the invention describes a principle where the image sensor can be made without any refractive element and with a flat top for easier integration with user device such as the display of a smartphone. Furthermore, the fingerprint sensor can be made significantly smaller compared to known optical fingerprint sensors suitable for display integration based on other technologies.

According to one embodiment of the invention, the transmission mask is formed as a repeating pattern consisting of a plurality of coded aperture elements, each coded aperture element being configured to form a coded image on the image sensor. The transmission mask is thus segmented into a plurality of sub-patterns. Thereby, multiple coded images are formed on the image sensor, i.e. one for each coded aperture element, where each coded image corresponds to a portion of the fingerprint. Each coded image is individually reconstructed, and the plurality of reconstructed images are subsequently stitched together to form the final image of the fingerprint. Thereby, the computational complexity of the image reconstruction can be reduced since a lower number of pixels of the image sensor is used at each individual reconstruction.

According to one embodiment of the invention, the plurality of coded aperture elements may be identical. Thereby, image reconstruction can be performed in the same manner for each coded image corresponding to a coded aperture element.

According to one embodiment of the invention, a distance between the image sensor and the transmission mask may be in the range of 50 μm to 3000 μm. The distance is mainly determined by the resolution requirement of the fingerprint sensor where the resolution is dependent on the distance between the object, e.g. the finger, and the transmission mask and the distance between the transmission mask and the image sensor. Assuming that the distance between the finger and the transmission mask is fixed, the resolution is increased with increasing distance between the transmission mask and the image sensor. Accordingly, there is a trade-off between the thickness and the resolution of the imaging device.

According to one embodiment of the invention the transmission mask may comprise an opaque material coated on the transparent substrate. The opaque material is thereby patterned such that it comprises openings forming the coded image aperture, thus forming the transmission mask.

According to one embodiment of the invention the transmission mask may advantageously be arranged on a side of the transparent substrate facing away from the image sensor. Thereby, the distance between the transmission mask and the image sensor is increased compared to if the transmission mask would be arranged on the side of the transparent substrate facing the image sensor. It is however possible to arrange the transmission mask on the side of the transparent substrate facing the image sensor, but this would require a device layout where a distance between the transmission mask and the image sensor is formed by other means. It is thus required to have certain distance between the transmission mask and the image sensor.

According to one embodiment of the invention, the image sensor circuitry may be configured to recreate an image of an object in contact with the outer surface of the imaging device based on the coded image. Thereby, the output from the biometric imaging device may be a reconstructed image of the entire finger. The image sensor circuitry may further be configured to perform fingerprint verification and user authentication such that all of the steps required for biometric authentication are performed by the image sensor circuitry. It is also possible that the image sensor circuitry only performs the readout from the image sensor, and that image reconstruction and other image processing steps are performed outside of the imaging device in itself.

According to one embodiment of the invention there is provided an in-display optical fingerprint sensor comprising: an at least partially transparent display panel; and an imaging device according to any one of the aforementioned embodiments arranged underneath the display panel. Thereby, the described imaging device can be integrated with a device panel based on various known display technologies as long as the display panel is sufficiently transparent to allow light reflected from a finger placed on the display surface to reach the image sensor for an image of the finger to be acquired. Moreover, the light from the display can be used to illuminate the finger such that reflected light reaches the image sensor.

According to one embodiment of the invention, the transmission mask may advantageously be designed based on a transmission pattern of the display panel. The transmissivity of the display panel may vary over the surface of the display panel. In particular, the display panel may have a repeating transmission pattern based on the properties o the pixel array. Since it is desirable to maximize the amount of light reaching the image sensor, the transmission mask is preferably adapted so that portions of the transmission mask with a higher proportion of openings coincide with portions of the display panel having higher transmittivity.

According to one embodiment of the invention the transmission mask may comprises an opaque material coated on the display panel on the side of the display panel facing the image sensor. Thereby, it may be possible to further increase the distance between the transmission mask and the image sensor. However, the desired performance of the imaging device can in principle be achieved irrespective of if the transmission mask is arranged on the display panel or on the transparent substrate, and manufacturing considerations may determine the precise location of the transmission mask.

According to a second aspect of the invention, there is provided a method for manufacturing an imaging device, the method comprising: providing an image sensor comprising a photodetector pixel array; providing a transparent substrate arranged to cover the image sensor; and forming a transmission mask arranged to cover the transparent substrate, wherein the transmission mask comprises a plurality of openings forming a coded aperture configured to project a coded image of an object in contact with the outer surface of the imaging device onto the image sensor.

The method may further comprise arranging a display panel on the transparent substrate.

Effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the optical biometric imaging device and method for manufacturing such a device according to the present invention are mainly described with reference to an optical fingerprint sensing device integrated in a display panel of a handheld device such as a smartphone. It should however be noted that the described imaging device equally well may be provided as a stand-alone device to be integrated in different applications where biometric imaging is desirable.

Figure 1:
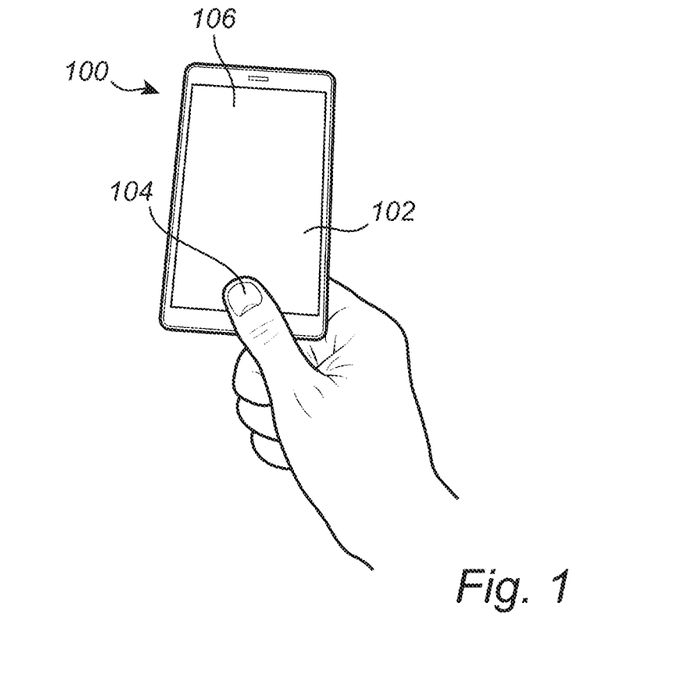
FIG. 1 schematically illustrates a handheld device comprising a biometric imaging device according to an embodiment of the invention.

FIG. 1 schematically illustrates a smartphone 100 comprising an optical biometric imaging device 102 integrated in the display panel of the smartphone 100. The optical biometric imaging device 102 is configured to capture an image of an object 103 in contact with an outer surface 106 of the biometric imaging device 102. The object in contact with the outer surface 106 is here illustrated as a finger 104 in contact with the surface 106 of the display panel. In addition to fingerprints, the described device 102 may also be used to capture palmprints.

Figure 2:
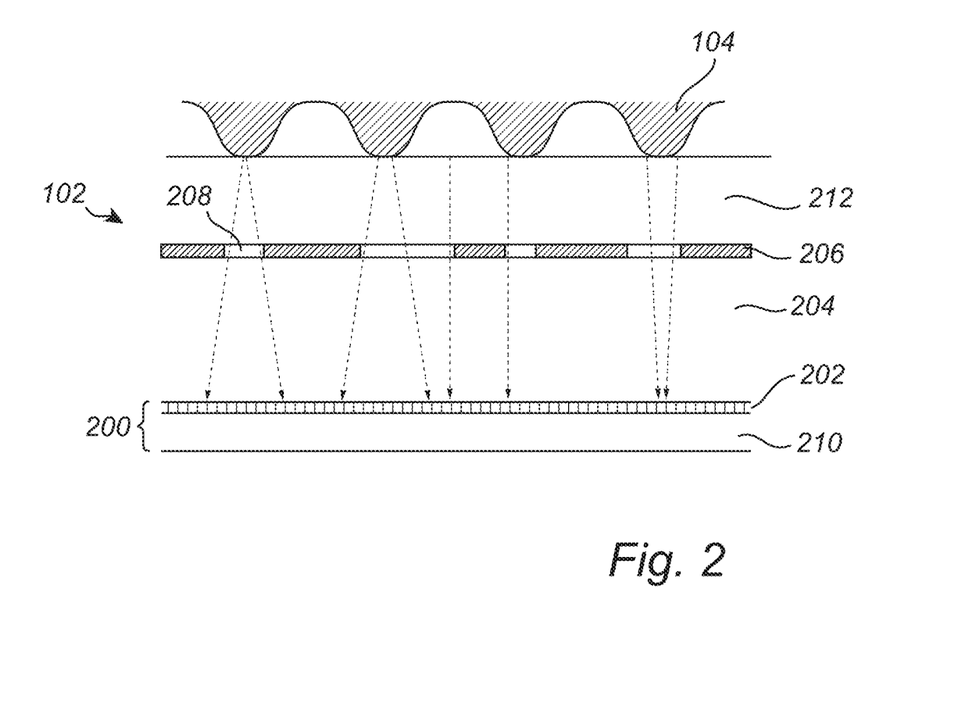
FIG. 2 schematically illustrates a biometric imaging device according to an embodiment of the invention.

FIG. 2 is a schematic illustration of a cross section of the biometric imaging device 102. The biometric imaging device 102 comprises an image sensor 200 which in turn comprises a photodetector pixel array 202. The biometric imaging device 102 further comprises a transparent substrate 204 arranged to cover the image sensor 200 and a transmission mask 206 arranged to cover the transparent substrate 206. The transparent substrate 204 is here illustrated as being on and in direct contact with the photodetector pixel array 202 of the image sensor 200. However, there may be additional layers located between the image sensor 200 and the transparent substrate 206 as long as such any additional layers are sufficiently transparent to allow light to reach the image sensor. Moreover, there may also be additional layers between the transparent substrate and the transmission mask 206. It is also possible to form a device comprising an air gap between different layers.

The transmission mask 206 comprises a plurality of openings 208, the openings forming a coded aperture configured to project a coded image of an object 104 in contact with the outer surface 106 of the biometric imaging device 102 onto the image sensor 200. Even though the transmission mask is illustrated as a binary mask, i.e. an absorptive transmission mask comprising opaque portions, it would also be possible to form an imaging device comprising a non-binary transmission mask with portions corresponding to the openings 208 having a transmittivity lower than one.

Moreover, the biometric imaging device 102 comprises image sensor circuitry 210 configured to capture an image corresponding to the coded image projected onto the photodetector pixel array 202 of the image sensor 200. The image sensor circuitry 210 is here illustrated as being integrated in the image sensor 200. However, many different configurations are possible, the image sensor circuitry 210 may be provided as a separate control unit, or it may be integrated in a device in which the biometric imaging device 102 is arranged. External image sensor circuitry for controlling the image sensor 200 may for example include a microprocessor, microcontroller, programmable digital signal processor or another programmable device.

In the present description, the light illuminating the finger 104 originates from a display panel 212 arranged above the transmission mask 206. Light emitted by light emitting elements of the display panel 212 is reflected by the finger and redirected towards the transmission mask such that light passing through the openings 208 form a coded image on the image sensor.

Figure 3A:
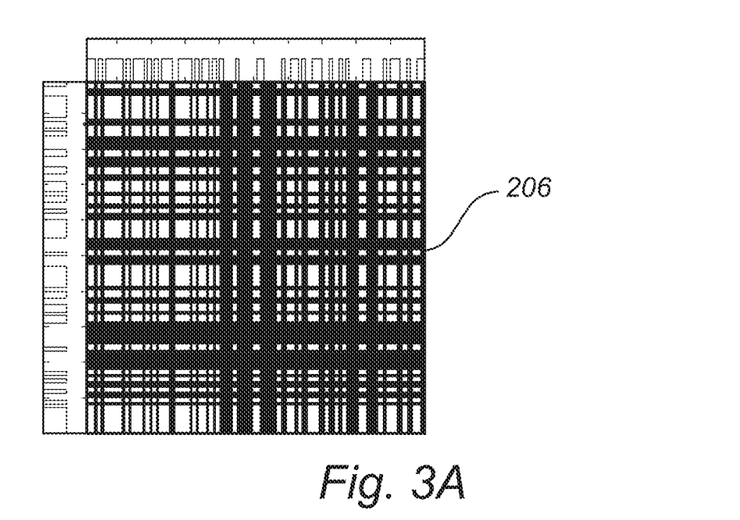
FIGS. 3A-B schematically illustrate features of a biometric imaging device according to an embodiment of the invention.
Figure 3B:
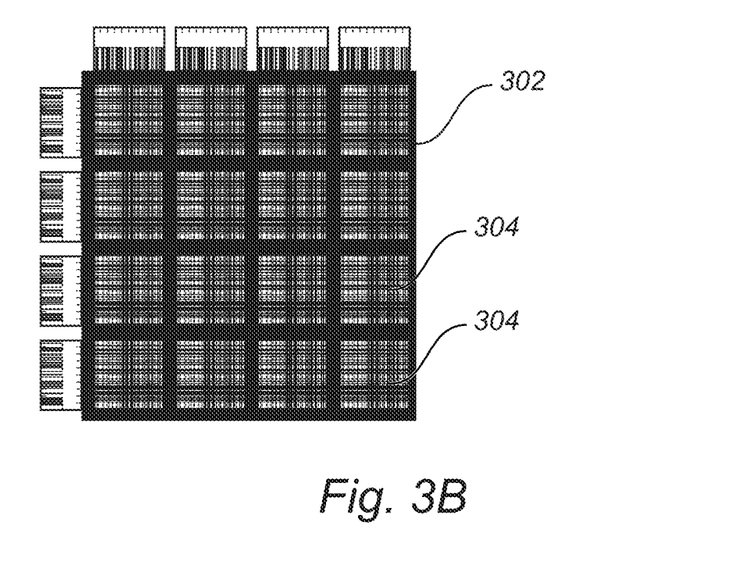
Figure 4A:
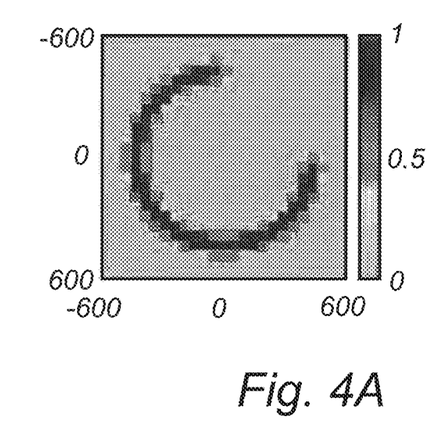
FIGS. 4A-D schematically illustrate the functionality of a biometric imaging device according to an embodiment of the invention.
Figure 4B:
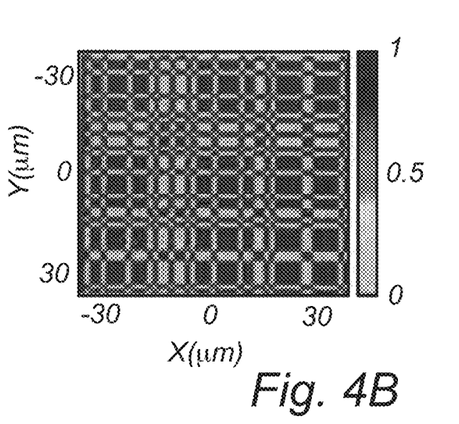
Figure 4C:
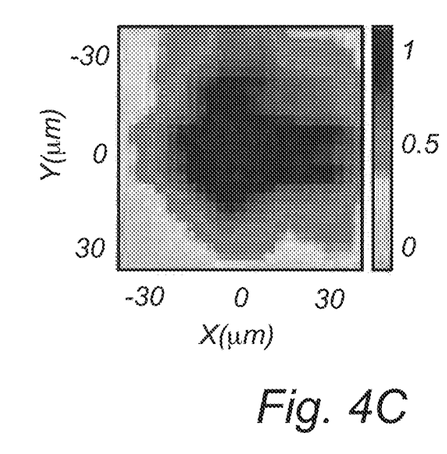
Figure 4D:
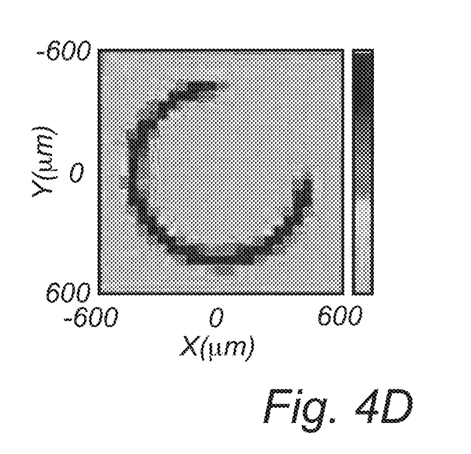

FIGS. 3A-b schematically illustrate examples of coded aperture transmission masks 206, 302 where FIG. 3A illustrates a single coded aperture element transmission mask 206 covering the image sensor 200 and where FIG. 3B illustrates a multiple coded aperture element transmission mask 302 covering the image sensor. The multiple coded aperture element transmission mask 302 is formed as a repeating pattern consisting of a plurality of coded aperture elements 304, each coded aperture element 304 being configured to form a coded image on the image sensor 200. All of the coded aperture elements 304 in the transmission mask 302 may be identical. However, it is in principle possible to use coded aperture elements with different configurations in a transmission mask.

The condition number of the combined matrix used to define the coded aperture element can be used as a figure of merit of the coded aperture.

The matrix for which the condition number is preferably optimized is the transfer matrix, H, of the system. The rows and columns of H describe how each pixel in the object relates to the pixels in the sensor for the specific system in question, i.e. the distance from the object to the transmission mask, the distance from the transmission mask to the sensor, and the physical transmission mask. The condition number of the transfer matrix H is a measure of how much an error in the image Y scales when inverting the transfer matrix to calculate the object X. Hence, with a lower condition number the calculation of X is more accurate.

A transmission mask can be constructed by multiplying two vectors, one column vector and one row vector to form a matrix. The two vectors may be identical or they may be different. In one example, the column vector could be different from the row vector and the coded aperture element can be optimized by flipping elements in the vector between 0 and 1 randomly, calculating the matrix condition number for the resulting matrix, and repeating until a satisfactory condition number is achieved.

When optimizing the transfer function, e.g. by changing the system parameters describing the transmission mask and distances, the optimization, i.e. the minimization of the condition number, can be regarded as finished when further changes of the system results in a change of the condition number which is below a threshold value.

By representing the object as an array of n×n pixels, each with a certain irradiance, and the image also as an array of n×n pixels, the imaging process can be represented in its simplest form as a matrix multiplication: Y=HX (1) where Y is a $[1 \times n^2]$ vector representing the sensor pixels in the image, X is a $[1 \times n^2]$ vector representing the pixels in the object, and H is a $[n^2 \times n^2]$ matrix correlating the contribution from each object pixel to each image pixel. To reconstruct the object from the recorded image, the inverse of the transfer matrix is used: $X=H^{-1}Y$ (2)

Hence, in order to use the coded aperture image, the system specific transfer matrix H must be determined, either by modelling or measurements.

In reality, the noise in the sensor and other error sources are preferably also taken into account, modifying the above equation to: Y=HX+E (3) where E is a $[1 \times n^2]$ vector.

If the number of elements in the image [m×m] is not identical to the number elements in the object [n×n], the transfer matrix is determined by solving the over-determined equation system instead. Note than m is preferably larger than n for a solution to exist. It is however possible for n to be larger than m and still have solution. The problem is that there is an infinite number of solutions. Regularization can help to get a better solution. Regularization also helps when the matrix is ill-conditioned, i.e. when the condition number is large.

FIGS. 4 A-D comprise simulated images schematically illustrating the functionality of the biometric imaging device 102. FIG. 4A shows image representing the original object and FIG. 4B illustrates a coded aperture transmission mask 206. FIG. 4C illustrates the sensor image corresponding to the light reflected by the object which in turn pass through the transmission mask 206 to reach the image sensor 200 and in FIG. 4D the image of the object has been restored based on the captured image of FIG. 4C and based on the knowledge of the properties of the coded aperture.

Figure 5:
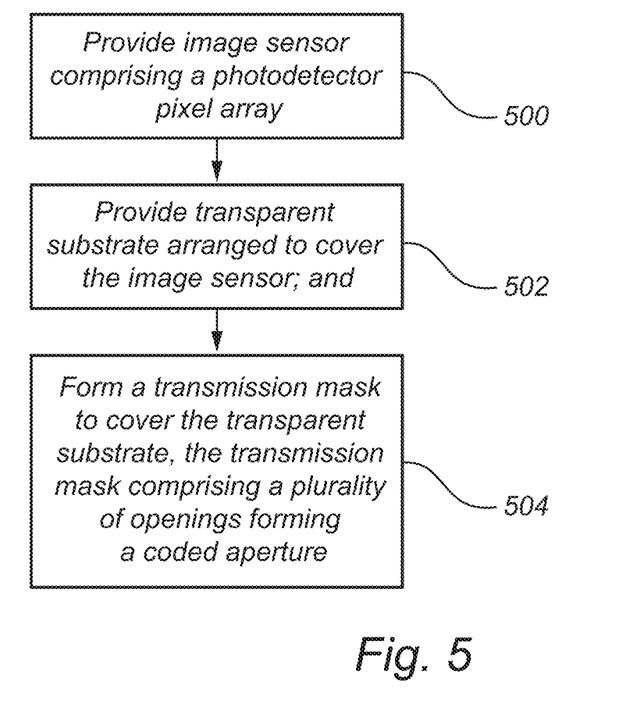
FIG. 5 is a flow chart outlining the general steps of a method for manufacturing a biometric imaging device according to an embodiment of the invention.

FIG. 5 is a flow chart outlining the general steps of a method of manufacturing an imaging device 102 according to a embodiment of the invention. The method will be described with further reference to FIGS. 6A-E illustrating selected steps of the manufacturing method.

Figure 6A:
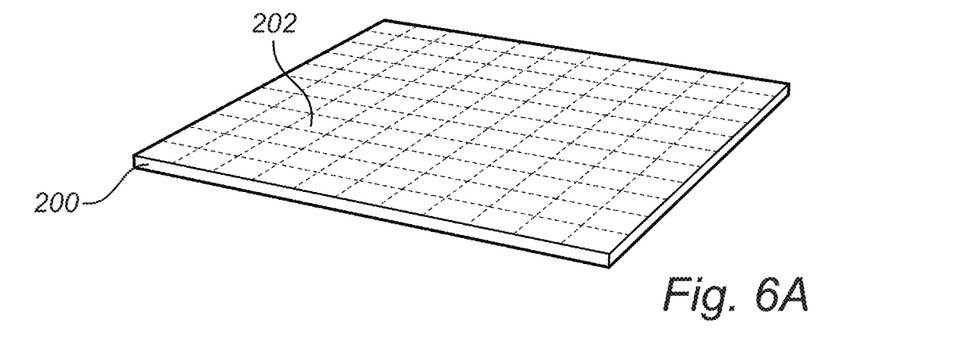
FIGS. 6A-E schematically illustrate general steps of a method for manufacturing a biometric imaging device according to an embodiment of the invention.

The method comprises providing 500 an image sensor 200 which in turn comprises a photodetector pixel array 202 at the surface of the image sensor 200 as illustrated in FIG. 6A.

Figure 6B:
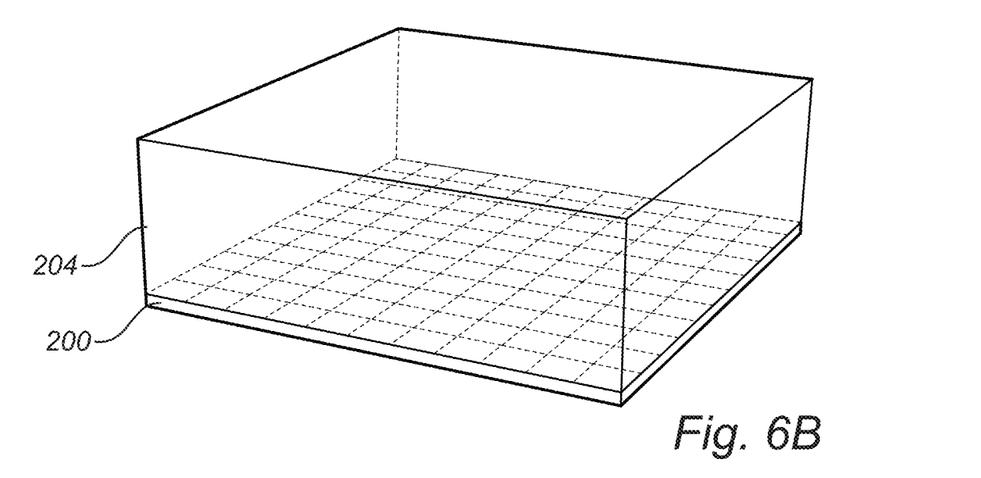
Figure 6C:
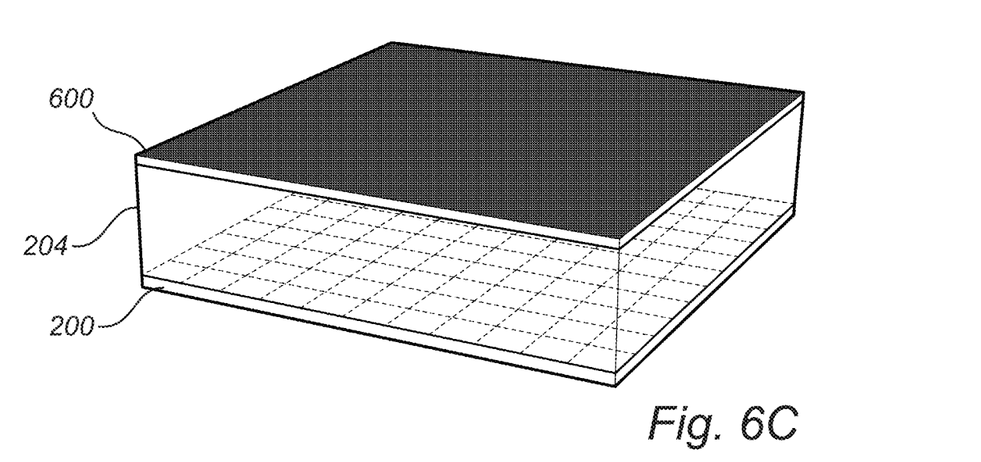

Next, a transparent substrate 204 is provided 502 to cover the image sensor 200, illustrated in FIG. 6B, followed by forming a mask layer 600 on the side of the transparent substrate 204 facing away from the image sensor, the mask layer being illustrated in FIG. 6C.

Figure 6D:
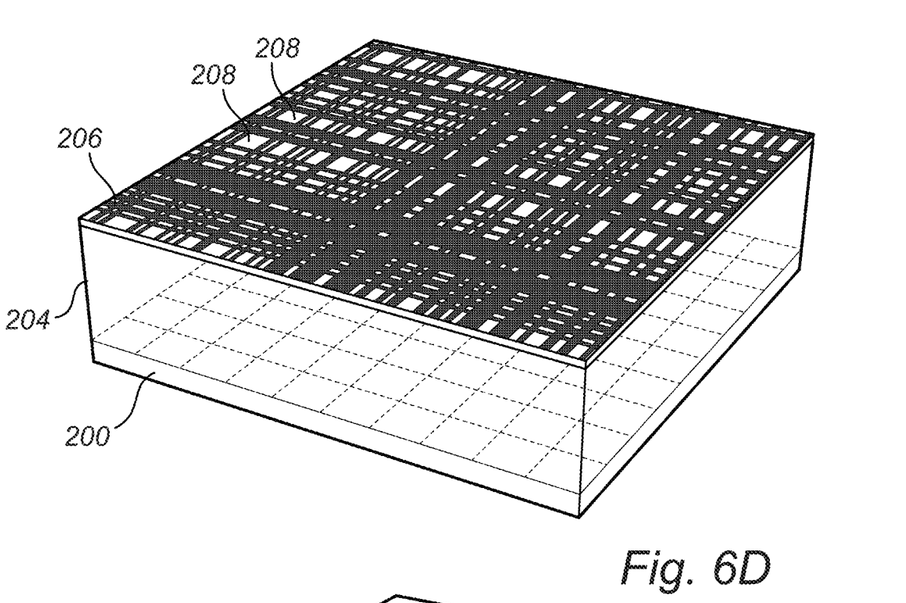

A transmission mask 206 is formed 504 by forming openings 208 in the mask layer 600, illustrated in FIG. 6D, so that the plurality of openings 208 form a coded aperture configured to project a coded image onto the image sensor 200. It is in principle possible to form the transmission mask on the side of the transparent substrate 204 facing the image sensor 200. However, such a configuration would require an additional transparent layer between the transmission mask 206 and the image sensor 200 since it is required that there is a certain distance between the transmission mask 206 and the image sensor 200 to form the coded image.

It is also possible to form the transmission mask 208 on the transparent substrate 204 prior to arranging the transparent substrate 204 on the image sensor.

Figure 6E:
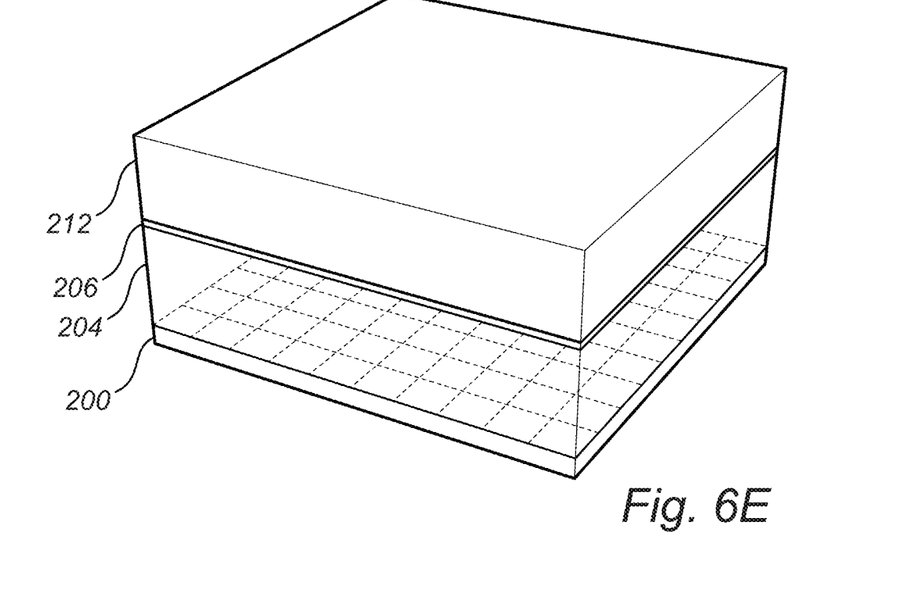

FIG. 6E further illustrates the step of arranging a display panel 212 on the transparent substrate 204. In applications where a display panel 212 is used, it is possible to form the transmission mask 206 on the bottom surface of the display panel 212.

Even though the invention has been described with reference to specific exemplifying embodiments thereof, many different alterations, modifications and the like will become apparent for those skilled in the art. Also, it should be noted that parts of the device and method may be omitted, interchanged or arranged in various ways, the device and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An optical biometric imaging device configured to capture an image of an object in contact with an outer surface of the biometric imaging device, the biometric imaging device comprising:
   an image sensor comprising a photodetector pixel array;
   a transparent substrate arranged to cover the image sensor;
   a transmission mask arranged to cover the transparent substrate, wherein the transmission mask comprises a plurality of openings, the openings forming a coded aperture configured to project a coded image of an object in contact with the outer surface of the imaging device onto the image sensor; and
   image sensor circuitry configured to capture an image corresponding to the coded image projected onto the image sensor,
   wherein the transmission mask is formed as a repeating pattern consisting of a plurality of coded aperture elements, each coded aperture element being configured to form a coded image on the image sensor, and
   wherein the plurality of coded aperture elements are identical.

2. The imaging device according to claim 1, wherein a distance between the image sensor and the transmission mask is in the range of 50 μm to 3000 μm.

3. The imaging device according to claim 1, wherein the transmission mask comprises an opaque material coated on the transparent substrate.

4. The imaging device according to claim 1, wherein the transmission mask is arranged on a side of the transparent substrate facing away from the image sensor.

5. The imaging device according to claim 1, wherein the image sensor circuitry is configured to recreate an image of an object in contact with the outer surface of the imaging device based on the coded image.

6. An in-display optical fingerprint sensor comprising:
   an at least partially transparent display panel; and
   an imaging device according to claim 1 arranged under the display panel.

7. The in-display optical fingerprint sensor according to claim 6, wherein the transmission mask is designed based on a transmission pattern of the display panel.

8. The in-display optical fingerprint sensor according to claim 6, wherein the transmission mask comprises an opaque material coated on the display panel on the side of the display panel facing the image sensor.

* * * * *